United States Patent
Ovshinsky et al.

(10) Patent No.: US 6,503,659 B1
(45) Date of Patent: Jan. 7, 2003

(54) LAYERED METAL HYDRIDE ELECTRODE PROVIDING REDUCED CELL PRESSURE

(75) Inventors: Stanford R. Ovshinsky, Bloomfield Hills, MI (US); Srinivasan Venkatesan, Southfield, MI (US); Boyko Aladjov, Rochester Hills, MI (US); Kevin Fok, Troy, MI (US); Thomas J. Hopper, Clarkston, MI (US); Lynn Taylor, Sterling Heights, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/352,255

(22) Filed: Jul. 13, 1999

(51) Int. Cl.⁷ .......................... H01M 4/58; H01M 4/48; H01M 2/16; H01M 2/18; H01M 10/52
(52) U.S. Cl. .................. 429/218.2; 429/59; 429/137; 429/220; 429/223; 429/247
(58) Field of Search ................................ 429/220, 223, 429/218.2, 247, 137, 59

(56) References Cited

U.S. PATENT DOCUMENTS

| | | | |
|---|---|---|---|
| RE34,471 E | | 12/1993 | Kameoka ..................... 429/59 |
| 5,830,603 A | * | 11/1998 | Oka et al. ................... 429/249 |
| 6,013,394 A | * | 1/2000 | Gan et al. ................... 429/325 |

OTHER PUBLICATIONS

Abstract of WO 99/17387 Apr. 8, 1999 Imoto, T. "Hydrogen Absorbing Alloy Electrode and Method of Producing Same".

* cited by examiner

Primary Examiner—Wayne A. Langel
Assistant Examiner—Jonas N. Strickland
(74) Attorney, Agent, or Firm—Philip H. Schlazer; Marvin S. Siskind

(57) ABSTRACT

A layered hydrogen absorbing alloy electrode for an alkaline electrochemical cell. The layered electrode comprises a outer layer comprising a metal oxide, metal sulfide or mixtures thereof. The outer layer reduces the internal pressure of electrochemical cell.

21 Claims, 2 Drawing Sheets

LAYERED METAL HYDRIDE ELECTRODE PROVIDING REDUCED CELL PRESSURE

FIELD OF THE INVENTION

The present invention relates to metal hydride electrodes for alkaline electrochemical cells. In particular, the present invention relates to a metal hydride electrode having a metal oxide or a metal sulfide surface layer.

BACKGROUND OF THE INVENTION

Rechargeable electrochemical cells using a hydrogen absorbing alloy as the active material for the negative electrode are known in the art. The negative electrode is capable of the reversible electrochemical storage of hydrogen. The positive electrode typically comprises a nickel hydroxide active material. The negative and positive electrodes are spaced apart in an alkaline electrolyte, and a suitable separator (i.e., a membrane) may be positioned between the electrodes.

As shown by reaction (1), upon application of an electrical current to the negative electrode, the hydrogen absorbing alloy (M) is charged by the absorption of hydrogen to form a hydride (M—H).

$$M+H_2O+e^- \rightarrow M\text{—}H+OH^- \text{ (Charging)} \quad (1)$$

During discharge, the stored hydrogen is released by the hydride to provide an electric current and participates in electrochemical reaction, as shown by reaction (2).

$$M\text{—}H+OH^- \rightarrow M+H_2O+e^- \text{ (Discharging)} \quad (2)$$

Examples of hydrogen absorbing alloys are disclosed in U.S. Pat. Nos. 4,551,400, 4,728,586, 5,096,667, 5,135,589, 5,277,999, 5,238,756, 5,407,761, and 5,536,591, the contents of which are incorporated herein by reference.

The reactions at a conventional nickel hydroxide positive electrode as utilized in a nickel-metal hydride electrochemical cell are as follows:

$$Ni(OH)_2+OH^- \rightarrow NiOOH+H_2O+e^- \text{ (Charging)} \quad (3)$$

$$NiOOH+H_2O+e \rightarrow Ni(OH)_2+OH^- \text{ (Discharging)} \quad (4)$$

Hence, as shown by reactions (1) and (2) above, the charging and discharging of the electrochemical cell involves the hydriding and dehydriding of the hydrogen storage alloys. Generally, the hydriding and dehydriding reactions in the electrochemical cell are accompanied by electrochemical charge transfer. These reactions also involve the transport of hydrogen atoms into and out of the hydrogen absorbing alloy. During the operation of the cells, particularly during high rate charge and discharge, significant hydrogen pressures can develop.

Specifically, during cell charging, atomic hydrogen is formed at the surface of the negative electrode. Preferably, the atomic hydrogen reacts with the hydrogen absorbing alloy as shown by reaction (1) to form a hydride. However, depending on charge conditions and surface properties of the hydrogen absorbing alloy, some of the atomic hydrogen may instead recombine with another atomic hydrogen to form molecular hydrogen gas and increase the internal pressure of the electrochemical cell.

Furthermore, in a typical nickel-metal hydride electrochemical cell, the negative electrode has an effective specific capacity which is greater than that of the positive electrode. Hence, during charging, the positive electrode reaches full charge before the negative and begins to evolve oxygen. The oxygen diffuses through the separator to the negative electrode. At the negative electrode some of the oxygen reacts with and discharges the metal hydride material to produce water. However, a portion of the oxygen fails to recombine in this manner but instead oxidizes the negative electrode which reduces the cycle life of the electrochemical cell. The remaining oxygen stays in the interior of the cell where it contributes to the overall increase in internal cell pressure.

While cells typically operate at pressures greater than atmospheric pressure, excessive hydrogen pressure and/or oxygen gas pressure is undesirable since it can result in a loss of aqueous-based electrolyte material, thereby limiting cell life. Also, if excess gas pressure is not vented, the cell can burst, deform, or otherwise be destroyed.

Clearly, it is desirable to limit excessive gas overpressure in electrochemical cells. Reduction of the internal cell pressure increases the cycle life of the electrochemical cell. The present invention relates to a novel layered electrode for the negative electrode of an alkaline electrochemical cell which reduces cell pressure within the electrochemical cell.

SUMMARY OF THE INVENTION

An objective of the present invention is to reduce the cell pressure within an alkaline electrochemical cell. Another objective of the present invention is to increase the cycle life of an alkaline electrochemical cell. Still another objective of the present invention is to increase the output power of an alkaline electrochemical cell.

These and other objectives are satisfied by a layered electrode for an alkaline electrochemical cell, comprising: a base hydrogen absorbing alloy electrode including a hydrogen absorbing alloy active material; and an outer layer affixed to at least a portion of the surface of said base electrode, said outer layer comprising at least one material selected from the group consisting of a metal oxide, a metal sulfide, and mixtures thereof.

These and other objectives are also satisfied by an alkaline electrochemical cell, comprising: a least one negative electrode; a least one positive electrode; and an alkaline electrolyte, wherein said negative electrode is a layered electrode comprising: a base hydrogen absorbing alloy electrode including a hydrogen absorbing alloy active material, and an outer layer affixed to at least a portion of the surface of said base electrode where said outer layer comprises a material selected from the group selected from a metal oxide, a metal sulfide, and mixtures thereof.

DETAILED DESCRIPTION OF THE INVENTION

The present invention is directed to a layered hydrogen absorbing alloy electrode for an alkaline electrochemical cell. The layered electrode comprises a base hydrogen absorbing electrode (the "base electrode"), and an outer layer affixed to at least a portion of the surface of the base electrode. The outer layer comprises a material selected from the group consisting of metal oxide, metal sulfide, and mixtures thereof. It is noted that, as used herein, the terminology "hydrogen absorbing alloy", "hydrogen storage alloy", and "metal hydride material" are used interchangeably.

Figure 1:
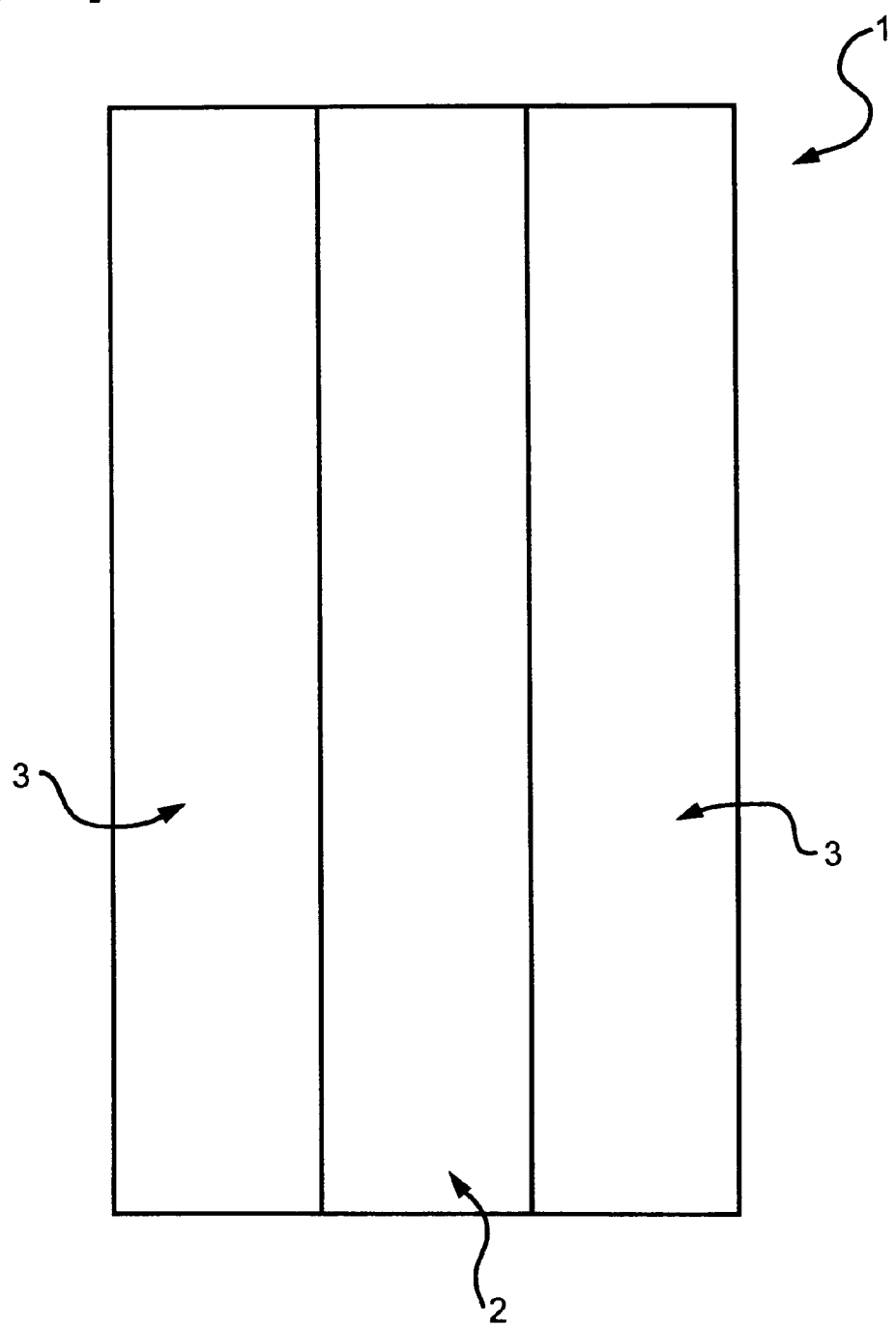
FIG. 1 is a simplified diagram of an embodiment of the layered electrode of the present invention showing an outer layer applied to opposite sides of a base electrode.

An embodiment of the layered electrode is shown in FIG. 1. As shown in FIG. 1, the layered electrode comprises a base hydrogen absorbing alloy electrode 2 referred to herein as the "base electrode". Generally, the base electrode may be any hydrogen absorbing alloy electrode that uses a hydrogen absorbing alloy as the active electrode material. Generally, the hydrogen absorbing alloy may be any hydrogen absorbing alloy known in the art. Examples of hydrogen absorbing alloys were presented in the patents incorporated by reference above.

The base electrode may be formed by affixing the hydrogen storage alloy active material onto a conductive substrate. The conductive substrate may be any type of conductive support for the active material. Examples of substrates include expanded metal, wire mesh, metal grid, perforated metal, plate, foil and foam. The actual form of substrate used may depend upon whether the substrate is used for the negative or the positive electrode, the type of active material used, whether it is a paste-type or a non-paste-type electrode, etc. Preferably, an expanded metal is used for the base electrode of the present invention. The conductive substrate is preferably formed from a metal such as copper, a copper alloy, nickel, or a nickel alloy. Commonly assigned U.S. Pat. Nos. 5,851,698 and 5,856,047, the contents of which are incorporated by reference herein, disclose negative metal hydride electrodes comprising a substrate made from substantially pure copper.

The active material may be affixed to the conductive substrate in different ways. For example, the active material may be compacted onto the substrate (rolling mills may be used to perform the compaction). Alternately, the active material may first be formed into a paste by adding water and a "thickener" such as (PVA), carboxymethyl cellulose (CMC) or hydroxypropylmethyl cellulose (HPMC) or the like to the active composition. The paste is then applied to the substrate to form the base electrode. Preferably, the substrate used for the negative electrode is an expanded metal.

The base electrode may also be formed by molding a mixture of a hydrogen absorbing alloy material and a conductive powder (i.e., such as a nickel powder). An example of this type of electrode is discussed in U.S. Pat. No. 5,905,004, the contents of which is incorporated by reference herein.

The layered electrode of the present invention further comprises an outer layer which is affixed to a least a portion of the base electrode. Preferably, the outer layer is affixed to the base electrode so that it is in contact with at least a portion of the hydrogen absorbing alloy material. Generally, the outer layer comprises at least one material selected from the group consisting of a metal oxide, a metal sulfide, and mixtures thereof. Preferably, the outer layer comprises at least one metal oxide. The metal oxide is preferably selected from the group consisting of copper oxide, silver oxide, and mixtures thereof. The metal sulfide is preferably selected from the group consisting of copper sulfide, silver sulfide, and mixtures thereof. It is noted that the added layer of metal oxide is distinct from the naturally occurring metal oxides that form on the surface of the metal hydride materials.

The outer layer may be affixed to the surface of the base electrode in different ways. The outer layer material may be pasted onto the surface of the base electrode. This is done by first forming the outer layer material into a paste (i.e., with the addition of a binder), and then applying the outer layer material to the surface of the base electrode. After the outer layer material is pasted onto the surface of the base electrode, the base electrode and outer layer may also be compacted in order to reduce the thickness of the layered electrode. In the embodiment of the layered electrode 1 shown in FIG. 1, the outer layer material 3 is pasted onto both of the wide sides of the base electrode 2. Hence, in the embodiment shown, the base electrode 2 is sandwiched between the outer layer material 3. The outer layer material may also be compacted onto the surface of the base electrode.

It is preferable, that the outer layer material is affixed to the base electrode after the base electrode is formed. For example, the layered electrode may be formed by first compacting or pasting the hydrogen absorbing alloy onto the conductive substrate, and then affixing the outer layer material onto the surface of the base electrode. However, it is also possible that the outer layer material is applied simultaneously with the hydrogen absorbing alloy material. For example, the active electrode material may be delivered to the surface of the substrate (for example, by a vibratory feeder), and the outer layer material may be delivered onto the top of the active electrode material (for example, also by a vibratory feeder). Both the active electrode material as well as the outer layer material may then be compacted simultaneously. Compaction may be accomplished by a rolling mill.

The outer layer material which forms a surface layer of the layered electrode decreases the internal pressure of the electrochemical cell. As discussed above, during the beginning stages of the charging cycle of a nickel-metal hydride electrochemical cell, the first reaction to take place on the negative electrode is the formation of atomic hydrogen. If the negative electrode active material is a good hydrogen absorber, the atomic hydrogen will be absorbed by the active material to form a metal hydride. However, if the active material is contaminated with impurities or with its own oxides, the atomic hydrogen may instead react with another hydrogen atom to form molecular hydrogen which is not absorbed by the active material. The molecular hydrogen causes the pressure within the cell to increase.

In the layered electrode of the present invention, an outer layer of either a metal oxide or a metal sulfide at least partially surrounds the electrode. With the addition of an outer metal oxide or metal sulfide surface layer, a portion of the atomic hydrogen reacts with the metal oxide or metal sulfide, thereby reducing the oxide or sulfide to metal. (For example, if the outer layer comprises copper oxide, then the atomic hydrogen reduces the copper oxide to copper. Similarly, if the outer layer comprises silver sulfide, then the atomic hydrogen reduces the silver sulfide to silver).

During the later stages of the charging cycle, the positive electrode reaches full charge before the negative and begins to evolve oxygen. The oxygen gas dissolves into the electrolyte and diffuses through the separator to the negative electrode. The oxygen that is evolved on the positive electrode dissolves into the electrolyte, diffuses through the separator, and reaches the negative electrode surface. The negative electrode surface of the layered electrode has an outer layer of a metal which was freshly formed by the earlier reduction of the metal oxide or metal sulfide (as described above). Although not wishing to be bound by theory, it is believed that the metal layer on the negative electrode reacts chemically with the oxygen that reaches its surface. The oxygen re-oxidizes the metal back to a metal oxide. However, by virtue of the potential at which the negative electrode surface is being held, the metal oxide once again gets reduced and forms fresh metal which is ready to receive more oxygen. Since oxygen is used to oxidize the metal, there is less oxygen available to increase the internal pressure of the electrochemical cell.

It is noted that because of the layered design of the electrode, the surface metal can easily be reached by the oxygen produced at the positive electrode. Hence, the oxidation of the metal back to metal oxide is facilitated and internal cell pressure is reduced. Furthermore, because of the layered design of the electrode, the oxygen must pass through the metal surface layer before reaching the active material. Hence, rather than oxidizing the active materials, the oxygen will instead oxidize the metal surface layer back to a metal oxide surface layer. This reduces the oxidation of the active electrode material so as to increase the electrode's ability to deliver peak power.

The electrodes of the present invention may be incorporated into alkaline electrochemical cells. Generally, disclosed herein is an alkaline electrochemical cell comprising one or more negative electrodes, one or more positive electrodes, and an alkaline electrolyte. At least one of the negative electrodes is a layered electrode of the present invention. In one embodiment of the electrochemical cell of the present invention each of the negative electrodes is a layered electrode of the present invention. The positive electrodes may comprise a nickel hydroxide active material so that the electrochemical cell is a nickel-metal hydride electrochemical cell.

It is noted that U.S. Pat. No. RE. 34,471 ("the '471 Patent") describes an electrode formed by first mixing one or more specified metal oxides with a hydrogen absorbing alloy and then applying the mixture to a substrate. Also, PCT Publication WO99/17387 ("the '387 Publication") describes a hydrogen absorbing alloy electrode where each of the hydrogen absorbing alloy particles has a surface layer of either copper, copper oxide, cobalt, or cobalt oxide.

The '471 Patent as well as the '387 Publication are distinguishable from the present invention. In the '471 Patent and in the '387 Publication, the specific metal oxide is added to the active material so that it is present within the bulk of the active material. In contrast, in the layered electrode of the present invention, the added metal oxide is added only as an electrode surface layer and is not present within the bulk of the active material.

Restricting the metal oxide to the electrode surface is advantageous. As explained above, it is believed that the metal oxide is reduced to metal as the electrochemical cell is charged.

It is further believed that at least a portion of this metal is chemically re-oxidized back to metal oxide by oxygen from the positive electrode. Placing the metal oxide material into the bulk of the active material therefore increases the chance that some of the added metal oxide either remains as oxide or is reconverted back to oxide (i.e., reduced to metal and then re-oxidized by oxygen) within the bulk so as to increase the electrical resistance within the bulk.

Furthermore, the addition of metal oxide into the bulk of the active material takes up volume that could instead be used for additional active material. This may decrease the capacity of the electrode.

EXAMPLE

Figure 2:
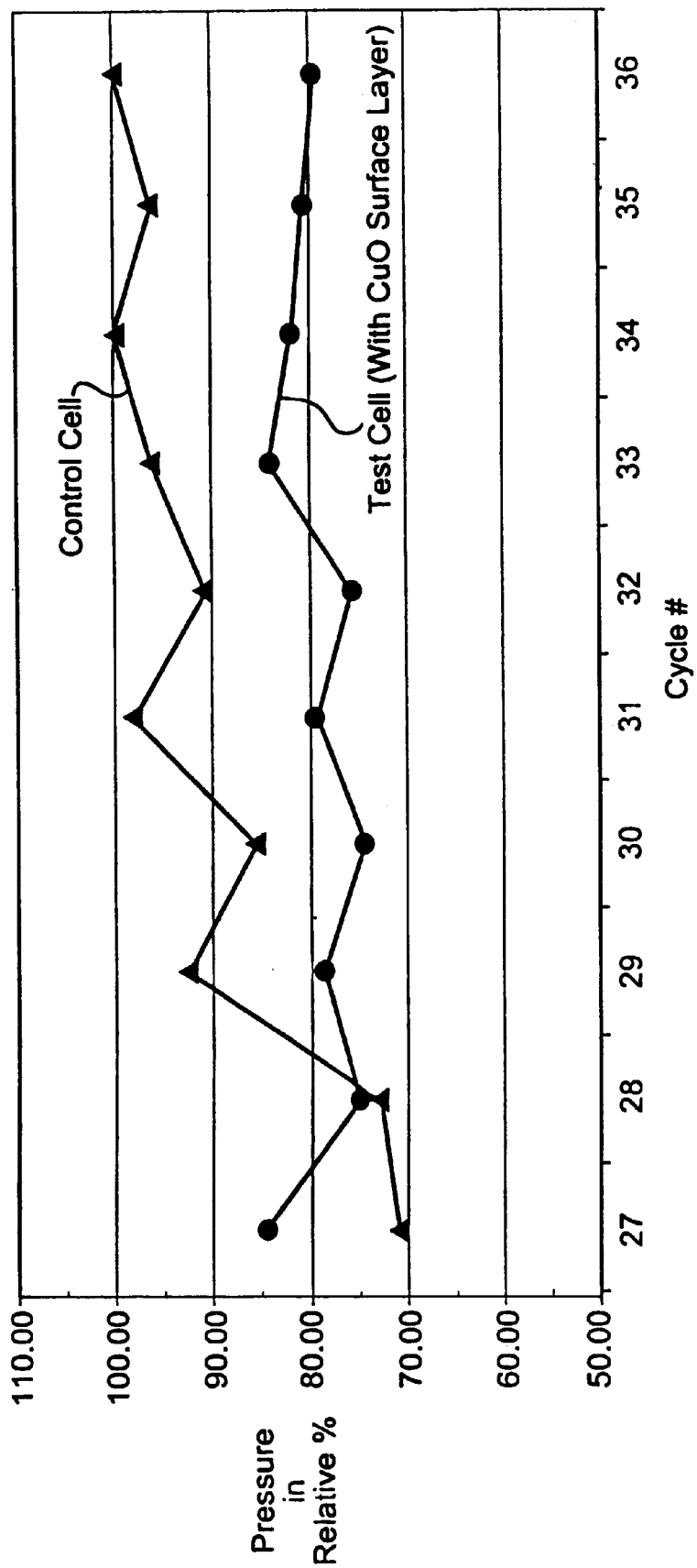
FIG. 2 is a plot of internal cell pressure versus charge/discharge cycle number for a test cell using hydrogen absorbing alloy negative electrodes with a copper oxide outer layer, and a control cell using hydrogen absorbing alloy negative electrodes without the outer layer.

A hydrogen-absorbing alloy active material is compacted onto a expanded metal conductive substrate to form a base negative electrode. A copper oxide powder is made into a paste by the addition of a PVA binder. The copper oxide paste is applied to the both sides of the base negative electrode to form a layered negative electrode. A "test" nickel-metal hydride electrochemical cell is made using the layered negative electrodes nickel hydroxide positive electrodes. The test cell is repeatedly charged and discharge. The pressure of the test cell is compared to the pressure of a "control" cell made with negative electrodes formed from the same hydrogen absorbing alloy but without the copper oxide surface layer. The results of the testing is shown in FIG. 2. As shown in FIG. 2, the internal pressure of the test cell is less that the internal pressure of the control cell. The vertical axis of the graph of FIG. 2 is internal cell pressure provided as "Pressure in "Relative %". All of the points of the graph are measured relative to the highest point of the control cell (which is shown as 100%). The horizontal axis of the graph is the charge/discharge cycle number.

While the invention has been described in connection with preferred embodiments and procedures, it is to be understood that it is not intended to limit the invention to the preferred embodiments and procedures. On the contrary, it is intended to cover all alternatives, modifications and equivalence which may be included within the spirit and scope of the invention as defined by the claims appended hereinafter.

We claim:

1. A layered hydrogen absorbing alloy electrode, comprising:
   a base hydrogen absorbing alloy electrode including a hydrogen absorbing alloy active material; and
   an outer layer affixed to at least a portion of the surface of said base electrode, said outer layer comprising at least one material selected from the group consisting of a metal oxide, a metal sulfide, and mixtures thereof, wherein the bulk of said base electrode is substantially free of said metal oxide and/or said metal sulfide.

2. The layered electrode of claim 1, wherein said outer layer comprises said metal oxide.

3. The layered electrode of claim 1, wherein said metal oxide comprises copper oxide and/or silver oxide.

4. The layered electrode of claim 1, wherein said outer layer is pasted onto at least a portion of the surface of said base electrode.

5. The layered electrode of claim 1, wherein said outer layer is compacted onto at least a portion of the surface of said base electrode.

6. The layered electrode of claim 1, wherein said active material is affixed to a conductive substrate.

7. The layered electrode of claim 6, wherein said active material is compacted onto said conductive substrate.

8. The layered electrode of claim 6, wherein said active material is pasted onto said conductive substrate.

9. An alkaline electrochemical cell, comprising:
   a layered electrode, comprising:
      a base hydrogen absorbing alloy electrode including a hydrogen absorbing alloy active material; and
      an outer layer affixed to at least a portion of the surface of said base electrode, said outer layer comprising at least one material selected from the group consisting a metal oxide, a metal sulfide, and mixtures thereof, wherein the bulk of said base electrode is substantially free of said metal oxide and/or said metal sulfide.

10. The electrochemical cell of claim 9, wherein said outer layer comprises said metal oxide.

11. The electrochemical cell of claim 9, wherein said metal oxide comprises copper oxide and/or silver oxide.

12. The electrochemical cell of claim 9, wherein said outer layer is pasted onto at least a portion of the surface of said base electrode.

13. The electrochemical cell of claim 9, wherein said outer layer is compacted onto at least a portion of the surface of said base electrode.

14. The electrochemical cell of claim 9, wherein said active material is affixed to a conductive substrate.

15. The electrochemical cell of claim 14, wherein said active material is compacted onto said conductive substrate.

16. The electrochemical cell of claim 14, wherein said active material is pasted onto said conductive substrate.

17. The alkaline electrochemical cell of claim 9, further comprising a nickel hydroxide electrode.

18. A layered hydrogen absorbing alloy electrode, comprising:

a base hydrogen absorbing alloy electrode including a hydrogen absorbing alloy active material; and an outer layer affixed to at least a portion of the surface of said base electrode, said outer layer comprising a metal oxide and/or a metal sulfide, wherein the concentration of said metal oxide and/or said metal sulfide at the interface of said outer layer and said base electrode is greater than the concentration of said metal oxide and/or said metal sulfide in the bulk of said base electrode.

19. The layered electrode of claim 18, wherein said metal oxide includes copper oxide and/or silver oxide.

20. An alkaline electrochemical cell, comprising:

a layered electrode, comprising:

a base hydrogen absorbing alloy electrode including a hydrogen absorbing alloy active material; and an outer layer affixed to at least a portion of the surface of said base electrode, said outer layer comprising a metal oxide and/or a metal sulfide, wherein the concentration of said metal oxide and/or said metal sulfide at the interface between said outer layer and said base electrode is greater than the concentration of said metal oxide and/or said metal sulfide in the bulk of said base electrode.

21. The electrochemical cell of claim 20, wherein said metal oxide includes copper oxide and/or silver oxide.

\* \* \* \* \*